United States Patent Office 3,364,026
Patented Jan. 16, 1968

3,364,026
FOGGED SILVER HALIDE DIRECT POSITIVE SO-
LARIZING ELEMENTS CONTAINING MERO-
CYANINE DYES
William W. Rees, Rochester, N.Y., assignor to Eastman
Kodak Company, Rochester, N.Y., a corporation of
New Jersey
No Drawing. Filed Feb. 14, 1963, Ser. No. 258,624
19 Claims. (Cl. 96—64)

This invention is related to photography and more particularly to direct positive solarizing photographic materials that produce images having lowered contrast.

Direct positive solarizing materials containing fogged silver halide emulsions which upon image exposure and development produce positive images are well known. It is known to add carbocyanine dyes to direct positive solarizing emulsions to increase their intrinsic sensitivity as well as the total sensitivity of the emulsion.

It is desirable to be able to prepare duplicates of radiographic pictures by methods employing the conventional processing used in the trade. Until recently, most duplicates have been prepared by giving a solarizing exposure to conventional radiographic films and processing in the normal manner. However, as conventional radiographic materials have been improved for their normal uses, the tendency towards efficient solarization has been drastically diminished.

For the reasons cited, a direct positive system compatible with standard processing conditions is desired for making duplicates of radiographic pictures.

It is therefore an object of my invention to provide a direct positive solarizing photographic material which when exposed and given conventional radiographic film processing produces images with a contrast or gamma in the range of from about 1.0 to about 1.3 which is needed for making good duplicate copies of radiographs.

Another object is to provide a coarse grained fogged silver halide emulsion containing a dye selected from a class of certain merocyanine dyes which can be coated on suitable supports to make valuable direct positive solarizing material that is used advantageously in existing processing systems to produce good duplicates of radiographs.

Still another object is to provide a class of merocyanine dyes which when added to fogged coarse-grained silver halide emulsions make them valuable for coating direct positive solarizing materials, by reducing the contrast (up to 50%) of image reproductions without making appreciable changes in $D_{max}$ or $D_{min}$.

Still further objects will become evident from the following specification and claims.

These and other objects are accomplished according to my invention by adding certain merocyanine dyes to fogged coarse-grained silver halide emulsions and coating the treated emulsions on suitable supports to make valuable direct positive solarizing elements which are used to advantage to produce good duplicates of radiographs by processing the image-exposed element in the same conventional processes used to process the original radiographs.

The same fogged coarse-grained silver halide emulsions coated without treatment with one of my merocyanine dyes produce direct positive images having a contrast that is up to about 100% too high for producing useable duplicates of radiographs in the normal process. Direct positive solarizing elements coated with the same fogged coarse-grained silver halide emulsions that were not treated with my merocyanine dyes but were treated instead with other dyes produced images that have contrasts that are 100% too high or even substantially higher than that. For example, the cyanine dyes, carbocyanine dyes tried, as well as merocyanine dyes outside my invention, produce no decrease in contrast but usually further increase the contrast.

It is therefore unexpected that the addition of my merocyanine dyes to coarse-grained silver halide emulsions would produce the large reduction in contrast (i.e. up to 50% reductions) needed to make such emulsions valuable for the direct positive solarizing materials desired. Furthermore, this large change in contrast is made without making any appreciable change in speed (i.e. $D_{max}$ and $D_{min}$).

The merocyanine dyes used to advantage according to my invention are represented by the following formula:

I.

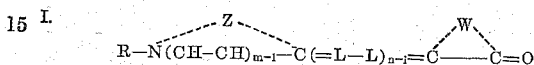

$$R-N(CH-CH)_{m-1}-C(=L-L)_{n-1}=C-----C=O$$

wherein $m$ represents an integer of from 1 to 2; Z represents the non-metallic atoms necessary to complete a heterocyclic nucleus such as those selected from the thiazole series (e. g., thiazole, 4-methylthiazole, 4-phenylthiazole, 5-methylthiazole, 4,5-dimethylthiazole, 4,5-diphenylthiazole, 4-(2-thienyl)thiazole, etc.), the benzothiazole series (e.g. benzothiazole, 4-chlorobenzothiazole, 5-chlorobenzothiazole, 6-chlorobenzothiazole, 7 - chlorobenzothiazole, 4-methylbenzothiazole, 5-methylbenzothiazole, 6-methylbenzothiazole, 5-bromobenzothiazole, 6-bromobenzothiazole, 4 - phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6 - dimethoxybenzothiazole, 5-hydroxybenzothiazole, 6-hydroxybenzothiazole, 5-carboxyethylbenzothiazole, 6 - sulfoethylbenzothiazole, etc.), the naphthothiazole series (e.g., naphtho[1,2]-thiazole, naphtho[2,1]-thiazole, 5-methoxynaphtho-[2,1] - thiazole, 5 - ethoxynaphtho[2,1] - thiazole, 8-methoxynaphtho[1,2] - thiazole, 7 - sulfoethylnaphtho-[1,2]-thiazole, etc.), the oxazole series (e.g., 4-methyloxazole, 5-methyloxazole, 4-phenyloxazole, 4,5-diphenyloxazole, 4-ethyloxazole, 4,5-dimethyloxazole, etc.), the benzoxazole series (e.g., benzoxazole, 5-chlorobenzoxazole, 5 - methylbenzoxazole, 5 - phenylbenzoxazole, 6-methylbenzoxazole, 5,6 - dimethylbenzoxazole, 4,6 - dimethylbenzoxazole, 5-methoxybenzoxazole, 5-ethoxybenzoxazole, 5-hydroxybenzoxazole, 6 - hydroxybenzoxazole, 6 - sulfoethylbenzoxazole, 6 - carboxyethylbenzoxazole, etc.), the naphthoxazole series (e.g., naphtho[1,2]oxazole, naphtho[2,1]oxazole, etc.), the selenazole series (e.g., 4-methylselenazole, 4-phenylselenazole, etc.), the benzoselenazole series (e.g., benzoselenazole, 5-chlorobenzoselenazole, 5 - methoxybenzoselenazole, 5 - hydroxybenzoselenazole, tetrahydrobenzoselenazole, etc.), the naphthoselenazole series (e.g., naphtho[1,2]selenazole, naphtho[2,1]selenazole, etc.), the indolenine series (e.g., 3,3 - dimethylindolenine, 3,3 - diethylindolenine, 3,3,5-trimethylindolenine, 3,3,7 - trimethylindolenine, etc.), the benzimidazole series (e.g., 3-ethylbenzimidazole, 3-phenylbenzimidazole, etc.), the naphthimidazole series (e.g., 3-ethylnaphth[2,1]imidazole, 3 - phenylnaphth[1,2]imidazole, etc.), the 2-quinoline series (e.g., quinoline, 3-methylquinoline, 5 - methylquinoline, 7 - methylquinoline, 8-methylquinoline, 6-chloroquinoline, 8-chloroquinoline, 6-methoxyquinoline, 6 - ethoxyquinoline, 6 - hydroxyquinoline, 8-hydroxyquinoline, etc.), the 4-quinoline series (e.g., quinoline, 6-methoxyquinoline, 7-methylquinoline, 8-methylquinoline, etc.), the 1-isoquinoline series (e.g., isoquinoline, 3,4-dihydroisoquinoline, etc.), the 2 - pyridine series (e.g., pyridine, 5-methylpyridine, etc.), the 4-pyridine series (e.g., pyridine, etc.), etc.; $n$ represents the integer 1, 2 or 3, R represents a group selected from the class consisting of alkyl groups (e.g., methyl, ethyl, n-propyl, n-butyl, isobutyl, n-amyl, isoamyl, β-methoxyethyl, β-ethoxyethyl, allyl (i.e., vinylmethyl), benzyl (i.e., phenylmethyl), β-phenylethyl, carboxymethyl, carboxyethyl, sulfomethyl, sulfobutyl, etc.) and an aryl group (e.g., phenyl, 4-methylphenyl, etc.); L represents a methine group (substituted and unsubstituted, e.g., =CH—, or =CR'— where R' represents an alkyl group, such as methyl, ethyl, etc., an aryl group, such as phenyl, etc., etc.; and W represents the non-metallic atoms necessary to complete a heterocyclic nucleus, such as those selected from the class consisting of the 2-thiazolin-4-one series (e.g., 2-thiazolin-4-one, 2-methyl-2-thiazolin-4-one, 2-methylthio-2-thiazolin-4-one, 2-ethyl-2-thiazolin-4-one, 2-phenyl-2-thiazolin-4-one, 2-(4-methylphenyl)-2-thiazolin-4-one, 2-diethylamino-2-thiazolin-4-one, 2 - (N-ethyl, N - phenylamino) - 2 - thiazolin - 4 - one, 2 - N, N-diphenylamino) - 2 - thiazolin-4-one, etc.), the 2,4-thiazolidinedione series (e.g., 2,4-thiazolidinedione, 3-phenyl-2,4 - thiazolidinedione, 3 - (4 - methylphenyl) - 2,4-thiazolidinedione, 3 - (2 - chlorophenyl)-2,4-thiazolidinedione, 3-(4-methoxyphenyl)-2,4-thiazolidinedione, 3 - (4 - carboxyphenyl) - 2,4 - thiazolidinedione, 3-methyl-2,4-thiazolidinedione, 3-butyl-2,4-thiazolidinedione, etc.), the 4-oxazolidinone series (e.g., 4-oxazolidinone, 2-amino-4-oxazolidinone, 2-acetylimino - 3 - ethyl - 4 - oxazolidinone, 2-acetylimino-3-phenyl-4-oxazolidinone, etc.), and the hydantoin series (e.g., hydantoin, 3-ethylhydantoin, 3-phenylhydantoin, 3-α-naphthylhydantoin, 1,3-diethylhydantoin, 1-phenyl-3-ethylhydantoin, 1-phenylhydantoin, 1-phenyl-3-phenylhydantoin, etc.).

In general, the dyes of my invention represented by Formula I in which $n$ is 1 are prepared by condensing a cyclammonium quaternary salt having the formula:

II.
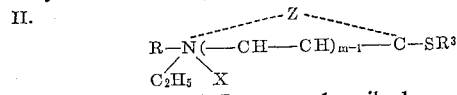

wherein $m$, R and Z are as described previously, $R^3$ is alkyl or aryl, and X represents an acid anion, e.g., chloride, bromide, iodide, p-toluene sulfonate, etc. with a compound having the formula:

III.

wherein W is as defined previously, in the presence of a condensing agent, e.g., triethylamine, and others. In general, the dyes in which $n$ is 2 or 3 are prepared by condensing a compound having the formula IV.
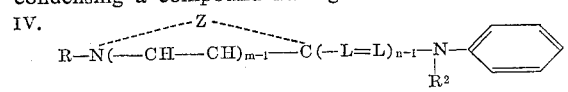

wherein $m$, R, Z, L and $n$ are as described previously and $R^2$ represents the hydrogen atom or the acetyl group, with a compound having the Formula III in the presence of sodium acetate and acetic anhydride.

Included among the merocyanine dyes used according to my invention are the following typical illustrative examples.

1
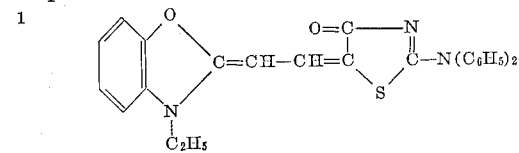
2-diphenylamino-5-[(3-ethyl-2-benzoxazolinylidene)ethylidene]-2-thiazolin-4-one 2
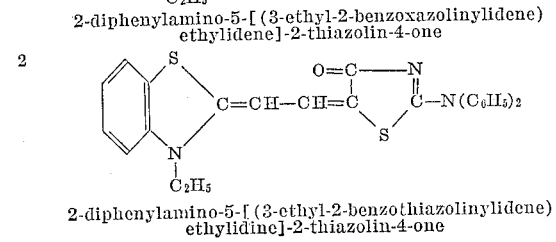
2-diphenylamino-5-[(3-ethyl-2-benzothiazolinylidene)ethylidene]-2-thiazolin-4-one 3
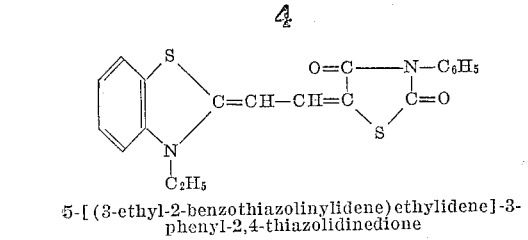
5-[(3-ethyl-2-benzothiazolinylidene)ethylidene]-3-phenyl-2,4-thiazolidinedione 4
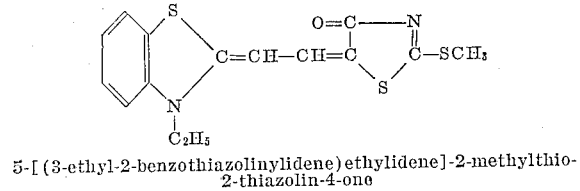
5-[(3-ethyl-2-benzothiazolinylidene)ethylidene]-2-methylthio-2-thiazolin-4-one 5
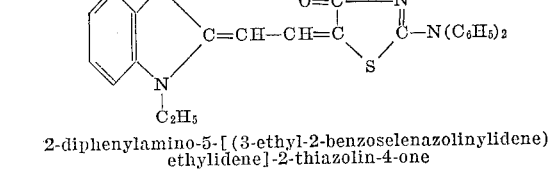
2-diphenylamino-5-[(3-ethyl-2-benzoselenazolinylidene)ethylidene]-2-thiazolin-4-one 6
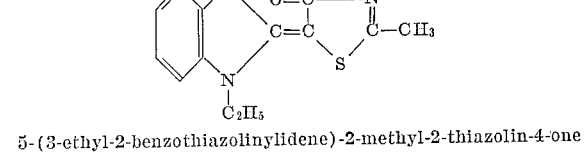
5-(3-ethyl-2-benzothiazolinylidene)-2-methyl-2-thiazolin-4-one 7
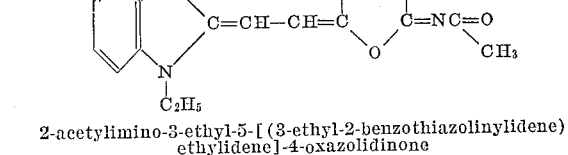
2-acetylimino-3-ethyl-5-[(3-ethyl-2-benzothiazolinylidene)ethylidene]-4-oxazolidinone 8
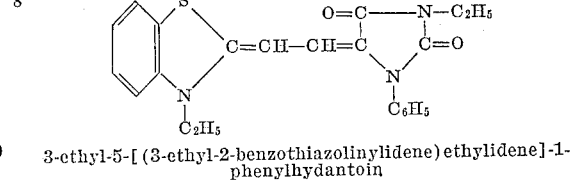
3-ethyl-5-[(3-ethyl-2-benzothiazolinylidene)ethylidene]-1-phenylhydantoin My merocyanine dyes are usually added as a solution to the melt of the desired fogged coarse-grained silver halide emulsion to be used for coating my direct positive solarizing element. Suitable solvents include water, lower alcohols, e.g., methyl alcohol, ethyl alcohol, nonyl alcohol, etc., ketones, e.g., acetone, etc., amines, e.g., triethylamine, etc., esters, e.g., orthocresylphosphate, etc., pyridine, mixtures of these solvents and other well-known solvents used in the art. The dyes may be used at various concentrations. It is preferred to use from about 50 to about 250 mg. of the dye per mole of silver halide in the emulsion. The optimum concentration will vary with the dye and the particular emulsion used, and can be determined readily by methods well-known in the art.

The coarse-grained silver halide emulsions used may contain any of the usual silver halide salts, such as, silver bromide, silver iodide, silver chloride, silver bromoiodide, silver chlorobromoiodide, etc., however silver bromoiodide is preferred. The silver halide is dispersed advantageously in any of the hydrophilic colloids conventionally used in photographic light-sensitive layers including gelatin, colloidal albumin, a cellulose derivative, or a synthetic resin, for instance, a polyvinyl compound. Some colloids which may be used are polyvinyl alcohol or a hydrolyzed polyvinyl acetate as described in Lowe, U.S. Patent 2,286,215, issued June 16, 1942; a far hydrolyzed cellulose ester, such as cellulose acetate hydrolyzed to an acetyl content of 19–26% as described in Lowe et al., U.S. Patent 2,327,808, issued August 24, 1943; a water-soluble ethanolamine cellulose acetate as described in Yutzy, U.S. Patent 2,322,085, issued June 15, 1943; a polyacrylamide having a combined acrylamide content of 30—60% and a specific viscosity of 0.25–1.5 or an imidized polyacrylamide of like acrylamide content and viscosity as described in Lowe et al., U.S. Patent 2,541,474, issued February 13, 1951; zein as described in Lowe, U.S. 2,563,791 issued August 7, 1951; a vinyl alcohol polymer containing urethane carboxylic acid groups of the type described in Unruh et al., U.S. Patent 2,768,154, issued October 23, 1956, or containing cyanoacetyl groups, such as the vinyl alcohol-vinyl cyano-acetate copolymer as described in Unruh et al., U.S. Patent 2,808,331, issued October 1, 1957; or a polymeric material which results from polymerizing a protein or a saturated acylated protein with a monomer having a vinyl group as described in Illingsworth et al., U.S. Patent 2,852,382, issued September 16, 1958.

The silver halide emulsion is fogged to maximum density by exposure to light or preferably by the addition of a chemical fogging agent which can be any reducing agent that will fog the silver halide without deleterious effects on the emulsion. Reducing agents used to advantage include materials such as thiourea dioxide, stannous chloride, formaldehyde, and other well-known fogging reducing agents.

Following the fogging operation, the usual addenda, such as spreading agents, hardening agents, etc. may be added advantageously to the emulsion, and the pH and p Ag may be adjusted as desired. The solution of my merocyanine dye is then added to the emulsion melt and intimately blended with it before coating the composition on a support.

The above-described emulsions can be coated on a wide variety of photographic emulsion supports by any of the well-known techniques. Typical supports include cellulose nitrate film, cellulose acetate film, polyvinyl acetal film, polystyrene film, polyethylene terephthalate film, polyethylene film, polypropylene film, and related films of resinous materials as well as paper, glass and others.

The direct positive solarizing materials of my invention are exposed to the original radiographic picture by contact printing methods, or by projection printing methods which provide means for making enlarged or reduced sized duplicates.

Any of the well-known developer and fixing baths are used to advantage in processing my exposed elements. It is particularly advantageous to use the same solutions that are normally used to process the original radiograph since these solutions are usually available where the duplicates will be made.

The following typical examples will further illustrate my invention.

EXAMPLE 1

A coarse-grained gelatino silver bromoiodide emulsion was fogged to maximum density at a pH of 8.5 with thiourea dioxide. After completion of the fogging operation, the desired spreading and hardening agents were added to the liquid melt, and the pH and p Ag were adjusted. The liquid melt was divided into separate portions. To five of these portions of the emulsion were added the amounts of my merocyanine dye indicated and the dye intimately mixed into the melt. The dyes 1 and 2 were added as solutions in methyl alcohol. Each portion of the emulsion was coated on a suitable support. After drying, these coatings were exposed in a sensitometer to a step wedge. The exposed elements were given identical development with an X-ray developer solution having the following composition:

| | G. |
|---|---|
| p-Methylaminophenolsulfate | 2.2 |
| Hydroquinone | 8.8 |
| Sodium sulfite, anhydrous | 72.0 |
| Sodium carbonate, anhydrous | 48.0 |
| Potassium bromide | 4.0 |
| Water to 1 liter. | |

The direct positive images developed were fixed in a conventional sodium thiosulfate fixing bath, washed and dried. Optical density measurements were made of the images with a densitometer and the image contrasts or gammas were determined. These data are summarized in the following table.

DYE ADDED TO EMULSION

| Dye Number | Mg./mole Silver Halide | $D_{max}$ | Gamma | Gross $D_{min}$ |
|---|---|---|---|---|
| Control | None | 2.44 | 2.6 | 0.20 |
| 1 | 150 | 2.48 | 1.35 | 0.16 |
| 2 | 50 | 2.43 | 2.4 | 0.0 |
| 2 | 100 | 2.45 | 1.9 | 0.19 |
| 2 | 150 | 2.46 | 1.64 | 0.20 |
| 2 | 200 | 2.48 | 1.28 | 0.16 |

From these data it is apparent that images produced with the coarse-grained silver halide direct positive solarizing emulsion control have contrasts (gammas) that are too high (2.6) for use in duplicating radiographic pictures. However, images made with the same emulsion containing my merocyanine dye #1 or #2 have the contrasts desired for duplicating purposes. From the concentration series made for Dye 2 it appears that this dye gives best results in the emulsion tested when used at 200 mg./mole of silver halide.

The use of other illustrative dyes of my invention in the production of valuable direct positive solarizing elements is shown in the next example.

EXAMPLE 2

Example 1 was repeated using the dyes indicated in the table below. The results obtained are summarized therein.

DYE ADDED TO EMULSION

| Dye Number | Mg./mole of Silver Halide | $D_{max}$ | Gamma | $D_{min}$ |
|---|---|---|---|---|
| Control | 0 | 1.85 | 2.02 | 0.15 |
| 3 | 100 | 1.92 | 1.36 | 0.18 |
| 4 | 60 | 1.71 | 1.10 | 0.20 |
| 5 | 90 | 1.63 | 1.26 | 0.14 |
| 6 | 120 | 1.67 | 1.49 | 0.15 |
| 7 | 100 | 1.62 | 1.53 | 0.15 |
| 8 | 60 | 1.72 | 1.41 | 0.16 |

These results further illustrate the valuable characteristics produced in my coarse-grained emulsions by the addition of one of my merocyanine dyes.

As indicated previously, it is surprising that my merocyanine dyes will reduce the contrast. It is even more surprising that they will produce as much as 50% reductions in the contrast and yet produce no appreciable change in the photographic speed. The following example will illustrate the unexpected results by comparing one of my dyes with merocyanine dyes outside my invention, and also cyanine and carbocyanine dyes.

EXAMPLE 3

A coarse-grained gelatino silver bromoiodide emulsion was fogged as described in Example 1 and divided into separate portions to which the indicated dye was added at the rate of 100 mg./mole of silver halide. Dye 2 is one of my dyes, while dye 9, 3-ethyl-5-[(3-ethyl-benzoxazolinylidene)ethylidene]rhodanine and dye 10, 5-[(3-ethyl- 2-benzothiazolinylidene)ethylidene]-3-methyl-2 - phenyl-4-thiazolidinone-1,1-dioxide are merocyanine dyes outside my invention. Each emulsion was coated on a cellulose acetate support at a coverage of 450 mg. of silver and 580 mg. of gelatin per square foot. A sample of each coating was given identical exposure in a sensitometer and given identical processing as described previously. The results are summarized in the following table.

DYE ADDED TO EMULSION

| Dye Number | $D_{max.}$ | Gamma | $D_{min.}$ |
|---|---|---|---|
| Control (no dye) | 1.64 | 1.88 | 0.15 |
| 2 | 1.76 | 1.30 | 0.17 |
| 9 | 1.74 | 2.82 | 0.12 |
| 10 | 1.84 | 2.06 | 0.15 |

This example shows that direct positive solarizing elements containing merocyanine dyes outside my invention such as dyes 9 and 10 produce higher contrast than the control instead of lower contrast and are not satisfactory for the desired use. Similarly, it can be shown that solarizing elements containing other merocyanine dyes outside my invention produce high contrasts and are not satisfactory. The elements containing my dye 2, however, are valuable.

EXAMPLE 4

Another coarse-grained gelatino silver bromoiodide emulsion was fogged as described in Example 1 and divided into separate portions to which the indicated dye was added. Each emulsion was coated on a cellulose acetate support, and the dried coatings were exposed and tested as in Example 3. The following results were obtained.

DYE ADDED TO EMULSION

| Dye Number | Mg. of dye/mole of Silver Halide | $D_{max.}$ | Gamma | $D_{min.}$ |
|---|---|---|---|---|
| Control | | 1.05 | 2.30 | 0.18 |
| 2 | 100 | 1.98 | 1.55 | 0.11 |
| 2 | 125 | 2.02 | 1.56 | 0.20 |
| 11 | 125 | 1.98 | 2.42 | 0.13 |
| 12 | 125 | 2.10 | 2.20 | 0.20 |

In this example it is apparent that my elements are the only ones that produce developed images with contrast levels that are useful for making duplicates of radiographs. The elements containing dye 11, i.e. 5,5'-dimethoxy-1,1',3,3,3',3'-hexamethylindocarbocyanine iodide, and dye 12, i.e. 3,3'-diethyl-9-methyl-thiacarbocyanine bromide are inoperative because of the high contrast images they produce.

By contrast measured as gamma, I mean the slope of the straight line portion of a graph made for the image exposed and developed photographic element, said graph relating the developed optical density of the image to the log of the exposure.

My dyes 1 through 5 or their analogs are described in Brooker, U.S. Patent 2,177,402, issued October 24, 1939. For example, my dyes 1 and 2 are Examples 7 and 8 respectively of U.S. 2,177,402. My dyes 3 and 4 are the benzothiazole analogs of the dyes in Examples 11 and 17 of the reference, and are prepared by the described synthesis by substituting 1-(β-anilinovinyl)-benzothiazole ethiodide for the corresponding benzoxazole quaternary salt intermediate. My dye 5 is the benzoselenazole analog of the dye in Example 8 of the reference and is formed by the synthesis shown by substituting 1-(β-anilinovinyl)-benzoselenazole ethiodide for the corresponding benzothiazole quaternary salt intermediate. My dye 6 is described as Example 1 of Heseltine and Brooker, U.S. Patent 2,927,026, issued March 1, 1960. It will be noted that the presently preferred nomenclature used for the immediate dyes differs from the preferred nomenclature used at the time the reference patents were issued.

Dye 7 was prepared as follows. A mixture of 3-ethyl-5-[(3-ethyl - 2 - benzothiazolidinylidene)ethylidene]-2-imino-4-oxazolidinone (1.58 g., 0.005 mole), acetic anhydride (1.28 g., 0.0125 mole), acetonitrile (10 ml.), and pyridine (3 ml.) were refluxed for 15 minutes. After cooling, the dye was precipitated with 50% aqueous methanol. The mixture was chilled overnight and the dye filtered, and dried. The dye was recrystallized twice from pyridine and 50% aqueous methanol to give 0.86 g. (48% yield) of dye, melting at 194–196° C.

Dye 8 is prepared by condensing equimolar amounts of 3-ethyl-2-formylmethylene benzothiazoline and 3-ethyl-1-phenylhydantoin by heating in acetic anhydride by a reaction similar to that described in Example 2 of Keyes and Brooker, U.S. Patent 2,185,343 issued January 2, 1940. In this reference, 3-ethyl-2-formylmethylene benzothiazole is named 1-ethyl-2-formylmethylene benzothiazole. This intermediate is formed by the alkaline hydrolysis of 3-(β-anilinovinyl)benzothiazole as described in Brooker, U.S. Patent 2,165,218 issued July 11, 1939.

Dye 9 is described as Example 16 in Brooker, U.S. Patent 2,170,803, issued August 29, 1939.

Dye 10 is described as Example 2 in Brooker and Heseltine, U.S. Patent 2,748,114, issued May 29, 1956.

Dyes 11 and 12 correspond to the dyes of Examples 12 and 14 respectively of Arens et al., U.S. Patent 2,323,187, issued June 29, 1943.

My fogged coarse-grained silver halide emulsions containing one of my merocyanine dyes are used to make valuable direct positive solarizing materials for producing good duplicates of radiographs in a system that uses the same processing solutions that are normally used to produce the original radiographs. Since these same emulsions either with no dye or a dye outside my invention are inoperative, it is unexpected that the addition of my merocyanine dyes will produce in these emulsions the desired photographic characteristics.

The invention has been described in detail with particular reference to preferred embodiments thereof but it will be understood that variations and modifications can be effected within the spirit and scope of the invention as described hereinabove and as defined in the appended claims.

I claim:

1. A direct positive solarizing photographic material comprising a coarse-grained silver halide emulsion that has been fogged to such an extent that it produces direct positive images upon exposure and development, said emulsion containing a merocyanine dye selected from those having this formula:

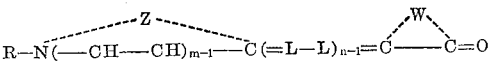

wherein $m$ represents an integer of from 1 to 2; Z represents the non-metallic atoms necessary to complete a heterocyclic nucleus selected from the class consisting of a thiazole nucleus, a benzothiazole nucleus, a naphthothiazole nucleus, an oxazole nucleus, a benzoxazole nucleus, a naphthoxazole nucleus, a selenazole nucleus, a benzoselenazole nucleus, a naphthoselenazole nucleus, a benzimidazole nucleus, a naphthimidazole nucleus, an indolenine nucleus, a 2-pyridine nucleus, a 4-pyridine nucleus, a 2-quinoline nucleus and a 4-quinoline nucleus; R represents a group selected from the class consisting of an aryl group and an alkyl group; L represents a methine group; $n$ represents an integer of from 1 to 3; and W represents a heterocyclic nucleus selected from the class consisting of those of the 2-thiazolin-4-one series, the 2,4-thiazolidinedione series, the 4-oxazolidinone series and the hydantoin series, said merocyanine dye having been added to said silver halide emulsion after it has been fogged to reduce the contrast of the said positive material to about 50 percent of the contrast of the material without the said merocyanine dye, without appreciably changing the speed of the said material.

2. A direct positive solarizing photographic material of claim 1 which contains from 50 to 250 mg. of said merocyanine dye per mole of silver halide in said emulsion.

3. A direct positive solarizing photographic material of claim 1 which was chemically fogged to maximum density with a reducing agent and contains from 50 to 250 mg. of said merocyanine dye per mole of silver halide in said emulsion.

4. A direct positive solarizing photographic material of claim 1 containing a merocyanine dye in which W represents the non-metallic atoms necessary to complete a heterocyclic nucleus of the 2-thiazolin-4-one series.

5. A direct positive solarizing photographic material of claim 1 containing a merocyanine dye in which W represents the non-metallic atoms necessary to complete a heterocyclic nucleus of the 2,4-thiazolidinedione series.

6. A direct positive solarizing photographic material of claim 1 containing a merocyanine dye in which W represents the non-metallic atoms necessary to complete a heterocyclic nucleus of the 4-oxazolidinone series.

7. A direct positive solarizing photographic material of claim 1 containing a merocyanine dye in which W represents the non-metallic atoms necessary to complete a heterocyclic nucleus of the hydantoin series.

8. A direct positive solarizing photographic material comprising a coarse-grained silver halide emulsion that has been fogged to such an extent that it produces direct positive images upon exposure and development, said emulsion containing the dye 2-diphenylamino-5-[(3-ethyl-2 - benzoxazolinylidene)ethylidene]-2-thiazolin-4-one to reduce the contrast of the said positive material to about 50 percent of the contrast of the material without the said dye, without appreciably changing the speed of the said material.

9. A direct positive solarizing photographic material comprising a coarse-grained silver halide emulsion that has been fogged to such an extent that it produces direct positive images upon exposure and development, said emulsion containing the dye 2-diphenylamino-5-[(3-ethyl-2 - benzothiazolinylidene)ethylidene]-2-thiazolin-4-one to reduce the contrast of the said positive material to about 50 percent of the contrast of the material without the said dye, without appreciably changing the speed of the said material.

10. A direct positive solarizing photographic material comprising a coarse-grained silver halide emulsion that has been fogged to such an extent that it produces direct positive images upon exposure and development, said emulsion containing the dye 5-[(ethyl-2-benzothiazolinylidene)ethylidene]-3-phenyl-2,4 - thiazolidinedione to reduce the contrast of the said positive material to about 50 percent of the contrast of the material without the said dye, without appreciably changing the speed of the said material.

11. A direct positive solarizing photographic material comprising a coarse-grained silver halide emulsion that has been fogged to such an extent that it produces direct positive images upon exposure and development, said emulsion containing the dye 2-acetyl-imino-3-ethyl-5-[(3-ethyl-2-benzothiazolinylidene)ethylidene]-4-oxazolidinone to reduce the contrast of the said positive material to about 50 percent of the contrast of the material without the said dye, without appreciably changing the speed of the said material.

12. A direct positive solarizing photographic material comprising a coarse-grained silver halide emulsion that has been fogged to such an extent that it produces direct positive images upon exposure and development, said emulsion containing the dye 3-ethyl-5-[(3-ethyl-2-benzothiazolinylidene)ethylidene]-1-phenylhydantoin to reduce the contrast of the said positive material to about 50 percent of the contrast of the material without the said dye, without appreciably changing the speed of the said material.

13. A process for making a coarse-grained silver halide emulsion composition for coating a direct positive solarizing photographic material for making duplicates of radiographs, said process comprising the step:
(1) adding to a fogged coarse-grained silver halide emulsion a merocyanine dye selected from those having the formula:

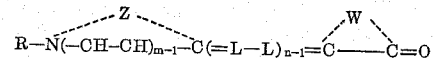

wherein $m$ represents an integer of from 1 to 2; Z represents the non-metallic atoms necessary to complete a heterocyclic nucleus selected from the class consisting of a thiazole nucleus, a benzothiazole nucleus, a naphthothiazole nucleus, an oxazole nucleus, a benzoxazole nucleus, a naphthoxazole nucleus, a selenazole nucleus, a benzoselenazole nucleus, a naphthoselenazole nucleus, a benzimidazole nucleus, a naphthimidazole nucleus, an indolenine nucleus, a 2-pyridine nucleus, a 4-pyridine nucleus, a 2-quinoline nucleus and a 4-quinoline nucleus; R represents an alkyl group; L represents a group selected from the class consisting of an aryl group and a methine group; $n$ represents an integer of from 1 to 3; and W represents a heterocyclic nucleus selected from the class consisting of those of the 2-thiazolin-4-one series, the 2,4-thiazolidinedione series, the 4-oxazolidinone series and the hydantoin series said dye being added to reduce the contrast of the said positive material to about 50 percent of the contrast of the material without the said dye, without appreciably changing the speed of the said material.

14. The process of claim 13 in which from 50 mg. to 250 mg. of said merocyanine dye is added per mole of silver halide.

15. A process for making a coarse-grained silver halide emulsion composition for coating a direct positive solarizing photographic material for making duplicates of radiographs, said process comprising the step:
(1) adding to a fogged coarse-grained silver halide emulsion from 50 to 250 mg. of the dye 2-diphenylamino-5-[(3-ethyl - 2 - benzoxazolinylidene)ethylidene]-2-thiazolin-4-one per mole of silver halide to reduce the contrast of the said material to about 50 percent of the said contrast of the material without the said dye, without appreciably changing the speed of the said material.

16. A process for making a coarse-grained silver halide emulsion composition for coating a direct positive solarizing photographic material for making duplicates of radiographs, said process comprising the step:
(1) adding to a fogged coarse-grained silver halide emulsion from 50 to 250 mg. of the dye 2-diphenylamino-5-[(3-ethyl - 2 - benzothiazolinylidene)ethylidene]-2-thiazolin-4-one per mole of silver halide to reduce the contrast of the said material to about 50 percent of the said contrast of the material without the said dye, without appreciably changing the speed of the said material.

17. A process for making a coarse-grained silver halide emulsion composition for coating a direct positive solarizing photographic material for making duplicates of radiographs, said process comprising the step:
(1) adding to a fogged coarse-grained silver halide emulsion from 50 to 250 mg. of the dye 5-[(3-ethyl-2-benzothiazolinylidene)ethylidene] - 3 - phenyl-2,4-thiazolidinedione per mole of silver halide to reduce the contrast of the said material to about 50 percent of the said contrast of the material without the said dye, without appreciably changing the speed of the said material.

18. A process for making a coarse-grained silver halide emulsion composition for coating a direct positive solarizing photographic material for making duplicates of radiographs, said process comprising the step:

(1) adding to a fogged coarse-grained silver halide emulsion from 50 to 250 mg. of the dye 2-acetylimino-3-ethyl-5-[(3-ethyl-2 - benzothiazolinylidene)ethylidene]-4-oxazolidinone per mole of silver halide to reduce the contrast of the said material to about 50 percent of the said contrast of the material without the said dye, without appreciably changing the speed of the said material.

19. A process for making a coarse-grained silver halide emulsion composition for coating a direct positive solarizing photographic material for making duplicates of radiographs, said process comprising the step:

(1) adding to a fogged coarse-grained silver halide emulsion from 50 to 250 mg. of the dye 3-ethyl-5-[(3-ethyl - 2 - benzothiazolinylidene)ethylidene]-1-phenylhydantoin per mole of silver halide to reduce the contrast of the said material to about 50 percent of the said contrast of the material without the said dye, without appreciably changing the speed of the said material.

References Cited

UNITED STATES PATENTS

| | | | |
|---|---|---|---|
| 2,493,747 | 1/1950 | Brooker et al. | 96—102 |
| 2,947,631 | 8/1960 | Carroll | 96—101 |
| 2,996,382 | 8/1961 | Luckey et al. | 96—94 |
| 3,237,008 | 2/1966 | Dostes et al. | 96—101 |
| 2,177,402 | 10/1939 | Brooker | 96—102 |
| 2,184,013 | 12/1939 | Leermakers | 96—102 |
| 2,323,187 | 6/1943 | Arens et al. | 96—64 |
| 2,756,148 | 7/1956 | MacWilliam | 96—102 |
| 2,497,876 | 2/1950 | Fallesen et al. | 96—64 |
| 2,541,472 | 2/1951 | Kendall et al. | 96—64 |

FOREIGN PATENTS 450,958   7/1936   Great Britain.

J. TRAVIS BROWN, *Acting Primary Examiner.*

NORMAN G. TORCHIN, *Examiner.*

UNITED STATES PATENT OFFICE
CERTIFICATE OF CORRECTION

Patent No. 3,364,026  
January 16, 1968

William W. Rees

It is certified that error appears in the above identified patent and that said Letters Patent are hereby corrected as shown below:

Column 9, line 12, "photo graphic" should read -- photographic --; line 54, "due" should read -- duce --. Column 10, lines 25 and 26, cancel "a group selected from the class consisting of an aryl group and" and insert the same after "represents" in line 24, same column 10.

Signed and sealed this 5th day of May 1970.

(SEAL)  
Attest:

Edward M. Fletcher, Jr.  
Attesting Officer

WILLIAM E. SCHUYLER, JR.  
Commissioner of Patents